(12) United States Patent
Su

(10) Patent No.: US 8,667,484 B2
(45) Date of Patent: Mar. 4, 2014

(54) METHOD AND RELATED MANAGEMENT ARCHITECTURE FOR MANAGING BUNDLES IN AN OPEN SERVICES GATEWAY INITIATIVE SERVICE PLATFORM

(75) Inventor: Chih-An Su, Taipei Hsien (TW)

(73) Assignee: Wistron Corporation, Hsichih, New Taipei (TW)

( * ) Notice: Subject to any disclaimer, the term of this patent is extended or adjusted under 35 U.S.C. 154(b) by 844 days.

(21) Appl. No.: 12/487,640

(22) Filed: Jun. 18, 2009

(65) Prior Publication Data

US 2010/0095296 A1    Apr. 15, 2010

(30) Foreign Application Priority Data

Oct. 9, 2008   (TW) ................................ 97138859 A

(51) Int. Cl.
*G06F 9/445*    (2006.01)
*G06F 9/44*     (2006.01)
*G06F 15/177*   (2006.01)

(52) U.S. Cl.
USPC ........... 717/174; 717/173; 717/175; 717/176; 717/177; 717/178; 709/220; 709/221; 709/222

(58) Field of Classification Search
None
See application file for complete search history.

(56) References Cited

U.S. PATENT DOCUMENTS

| | | | |
|---|---|---|---|
| 6,272,674 B1 * | 8/2001 | Holiday, Jr. ................... | 717/174 |
| 7,082,460 B2 * | 7/2006 | Hansen et al. ................. | 709/220 |
| 7,231,424 B2 * | 6/2007 | Bodin et al. ................... | 709/204 |
| 7,315,826 B1 * | 1/2008 | Guheen et al. ................ | 705/7.29 |
| 7,398,305 B2 * | 7/2008 | Bodin et al. ................... | 709/222 |
| 7,437,432 B2 * | 10/2008 | Bodin et al. ................... | 709/220 |
| 7,478,396 B2 * | 1/2009 | Hayes, Jr. ...................... | 719/311 |
| 7,640,542 B2 * | 12/2009 | Herenyi et al. ................ | 717/177 |
| 7,716,663 B2 * | 5/2010 | Hayes, Jr. ...................... | 717/174 |
| 7,818,733 B2 * | 10/2010 | Hargrave et al. .............. | 717/166 |
| 7,853,672 B2 * | 12/2010 | Murai et al. ................... | 709/220 |
| 7,966,617 B2 * | 6/2011 | Hayes, Jr. ...................... | 719/311 |
| 8,111,414 B2 * | 2/2012 | Sato et al. ..................... | 358/1.15 |
| 8,135,811 B2 * | 3/2012 | Bodin et al. ................... | 709/221 |
| 2003/0192043 A1 * | 10/2003 | Lin et al. ....................... | 717/178 |
| 2004/0117465 A1 * | 6/2004 | Bodin et al. ................... | 709/222 |
| 2004/0117494 A1 * | 6/2004 | Mitchell et al. ............... | 709/230 |
| 2004/0194059 A1 * | 9/2004 | Akella et al. .................. | 717/118 |
| 2005/0193388 A1 * | 9/2005 | Hayes, Jr. ...................... | 717/174 |
| 2005/0210474 A1 * | 9/2005 | Hayes, Jr. ...................... | 719/310 |

(Continued)

FOREIGN PATENT DOCUMENTS

CN          1855818 A        11/2006
CN          101176335 A      5/2008

OTHER PUBLICATIONS

Office action mailed on May 25, 2011 for the China application No. 200810171633.3, p. 3 line 5~16 and line 20~28. Translation.

(Continued)

*Primary Examiner* — Henry Tsai
*Assistant Examiner* — Jing-Yih Shyu
(74) *Attorney, Agent, or Firm* — Winston Hsu; Scott Margo

(57) ABSTRACT

A method for managing a plurality of bundles in an open services gateway initiative service platform includes adding the plurality of bundles into a service list and generating configuration files corresponding to the plurality of bundles, storing the configuration files, updating a status corresponding to a first bundle of the plurality of bundles in the service list when the first bundle is initiated, and loading a configuration file corresponding to the first bundle.

2 Claims, 4 Drawing Sheets

(56) References Cited

U.S. PATENT DOCUMENTS

2006/0248332 A1* 11/2006 Kim et al. .................... 713/155
2008/0320469 A1* 12/2008 Jung et al. .................... 717/176
2009/0080013 A1* 3/2009 Sato et al. .................... 358/1.15

OTHER PUBLICATIONS

Office action mailed on Jul. 12, 2012 for the Taiwan application No. 097138859, p. 2 line 16-26, p. 3 line 1-16 and line 18-21.

* cited by examiner

METHOD AND RELATED MANAGEMENT ARCHITECTURE FOR MANAGING BUNDLES IN AN OPEN SERVICES GATEWAY INITIATIVE SERVICE PLATFORM

BACKGROUND OF THE INVENTION

1. Field of the Invention

The present invention is related to a method and related management architecture for managing bundles in an open services gateway initiative service platform, and more particularly, to a method and related management architecture for improving a modular level, communicative ability and transplantation ability in the open services gateway initiative service platform.

2. Description of the Prior Art

With the rapid development of Internet, Internet services are blooming, and no longer limited in job scope, but associated with home life instead, so that lifestyle of digital home is started. In digital home services, a home gateway, communicating with internal and external networks, plays a crucial role. All kinds of devices in a house can communicate with each other through the home gateway.

Open Services Gateway Initiative (OSGi) is an integrated platform of information services, integrated into a gateway, so that application programs and value-added services, provided by a remote service provider, can be dynamically downloaded to the home gateway via Internet, and automatically installed. OSGi realizes a complete and dynamical device module, such that applications (named Bundles) can be remotely installed, initiated, updated and removed without re-guiding. Furthermore, the corresponding Application Programming Interface (API) defines life cycle management for performing remote downloading, and service registry allows bundles to exam new and canceled services.

In the beginning, OSGi focuses on the home gateway. However, applications of OSGi are broadened, and can be applied to telecommunication service products, embedded in Personal Digital Assistants (PDA) and mobile phones, or co-worked with personal computers and other consumer electronic products. For example, a Session Initiation Protocol (SIP) communicator, an all aspect communication software or instant message (IM) software based on OSGi, has many advantages such as cross-platform transplantation, and supports many kinds of IM communication systems, such as ICQ, MSN, AOL Yahoo message, Jabber and so on, as well as transmission and receipt of video signals of network phones.

In the prior art, the SIP communicator can mainly be divided into three parts: Protocol Service Bundle, User Interface Service Bundle and Libraries Bundle. The relationship of each bundle conforms to the OSGi rule, such that removing any of the bundles does not affect other bundles. In the SIP communicator, User Interface Service Bundle is an entry point of the main program; that is, configuration of the SIP communicator is controlled by User Interface Service Bundle. In such a case, since User Interface Service Bundle is represented by a user interface, a user cannot set the SIP communicator if the SIP communicator is installed in an architecture without any peripheral output, which may affect operations of the SIP communicator.

SUMMARY OF THE INVENTION

It is therefore a primary objective of the claimed invention to provide a method and related management architecture for managing a plurality of bundles in an open services gateway initiative service platform.

The present invention discloses a method for managing a plurality of bundles in an open services gateway initiative service platform, which comprises adding the plurality of bundles into a service list, and generating configuration files corresponding to the plurality of bundles, storing the configuration files corresponding to the plurality of bundles, updating a status corresponding to a first bundle of the plurality of bundles in the service list when the first bundle is initiated, and loading a configuration file corresponding to the first bundle.

The present invention further discloses a management architecture for managing a plurality of bundles in an open services gateway initiative service platform, which comprises a setting unit, for adding the plurality of bundles into a service list, and generating configuration files corresponding to the plurality of bundles, a storing unit, for storing the configuration files corresponding to the plurality of bundles, an updating unit, for updating a status corresponding to a first bundle of the plurality of bundles in the service list when the first bundle is initiated, and a loading unit, for loading a configuration file corresponding to the first bundle.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
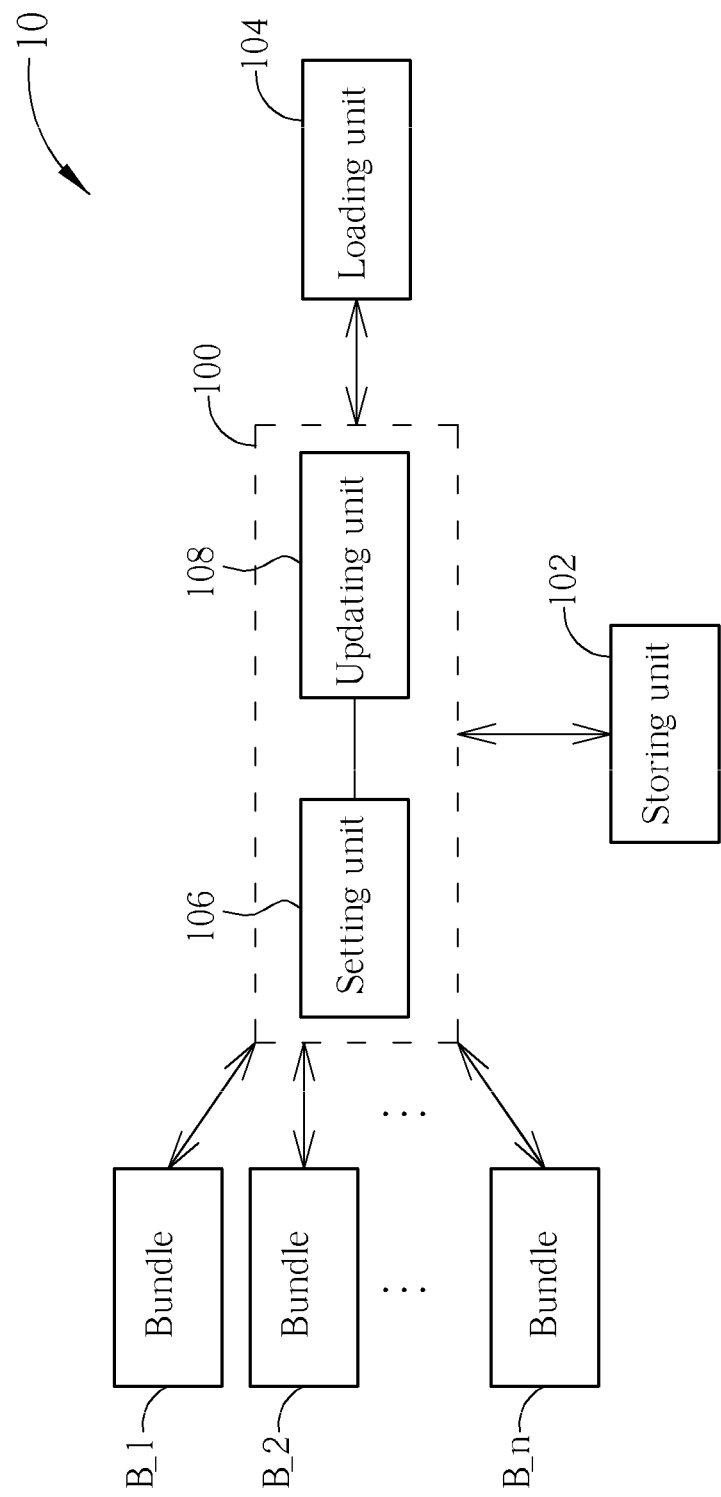
FIG. 1 illustrates a schematic diagram of a management architecture for an open services gateway initiative service platform according to an embodiment of the present invention.

Please refer to FIG. 1, which is a schematic diagram of a management architecture for an OSGi platform 10 in accordance with an embodiment of the present invention. The management architecture 10 is utilized for managing bundles B_1~B_n, and comprises a management device 100, a storing unit 102 and a loading unit 104. The management device 100 comprises a setting unit 106 and an updating unit 108. The setting unit 106 is used for adding the bundles B_1~B_n to a service list and generating configuration files corresponding to the bundles, and the generated configuration files are stored in the storing unit 102. The updating unit 108 is used for updating a status corresponding to a bundle B_x in the service list when the bundle B_x is initiated, such that the loading unit 104 can load a configuration file corresponding to the bundle B_x.

Figure 2:
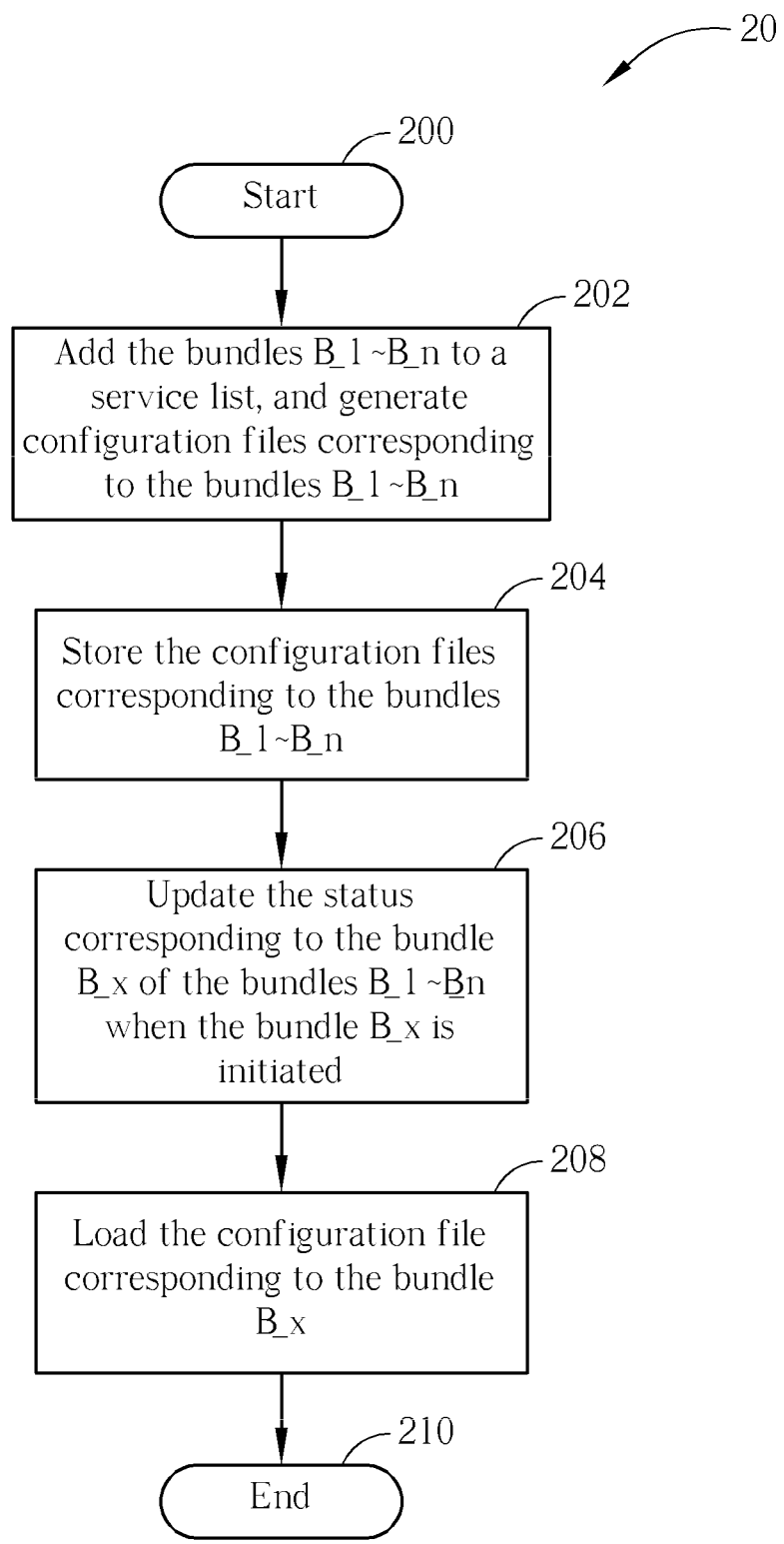
FIG. 2 is a schematic diagram of a process for the management architecture shown in FIG. 1.
Figure 3:
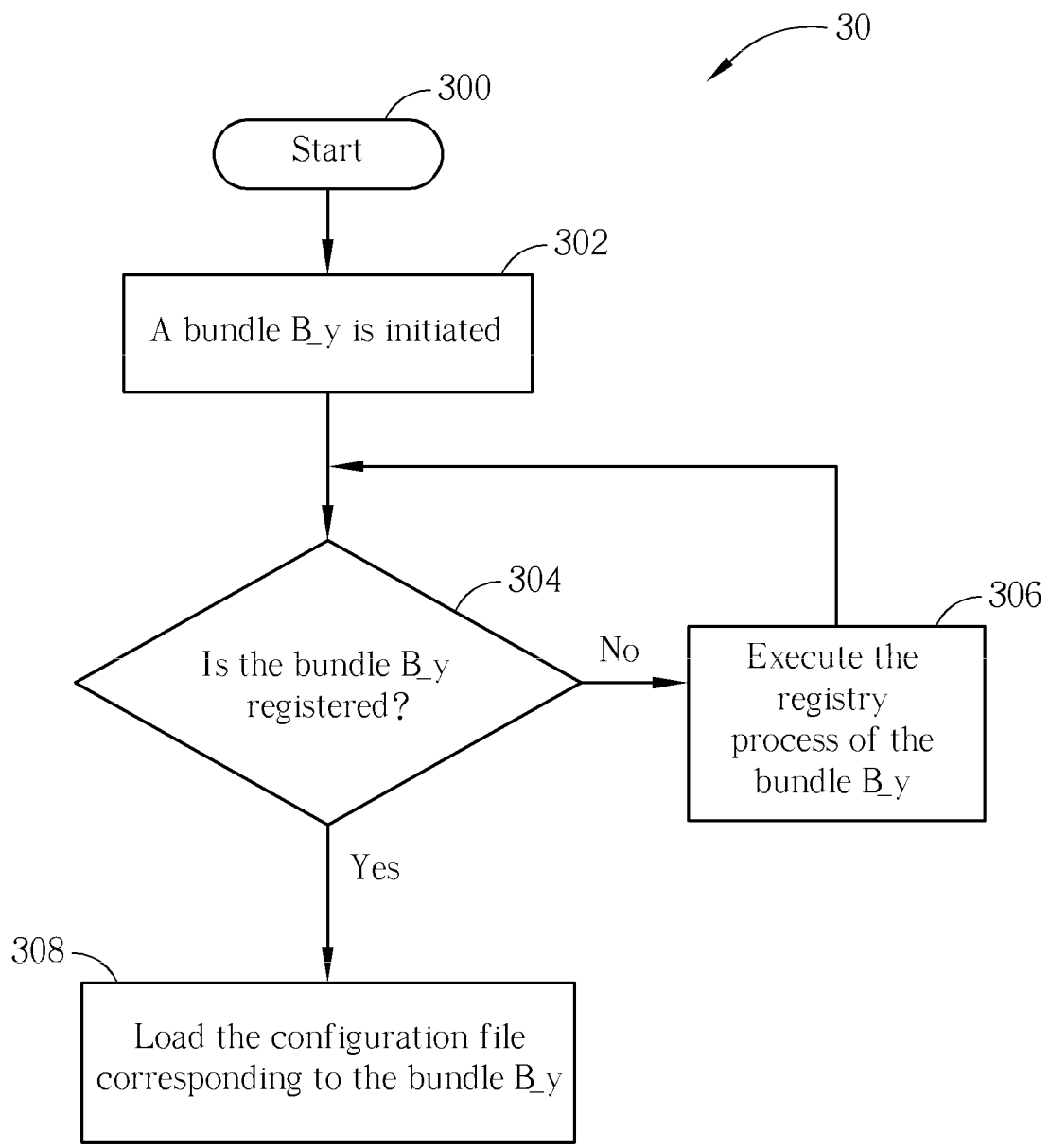
FIG. 3 is a schematic diagram of an initiation process for the management architecture shown in FIG. 1.
Figure 4:
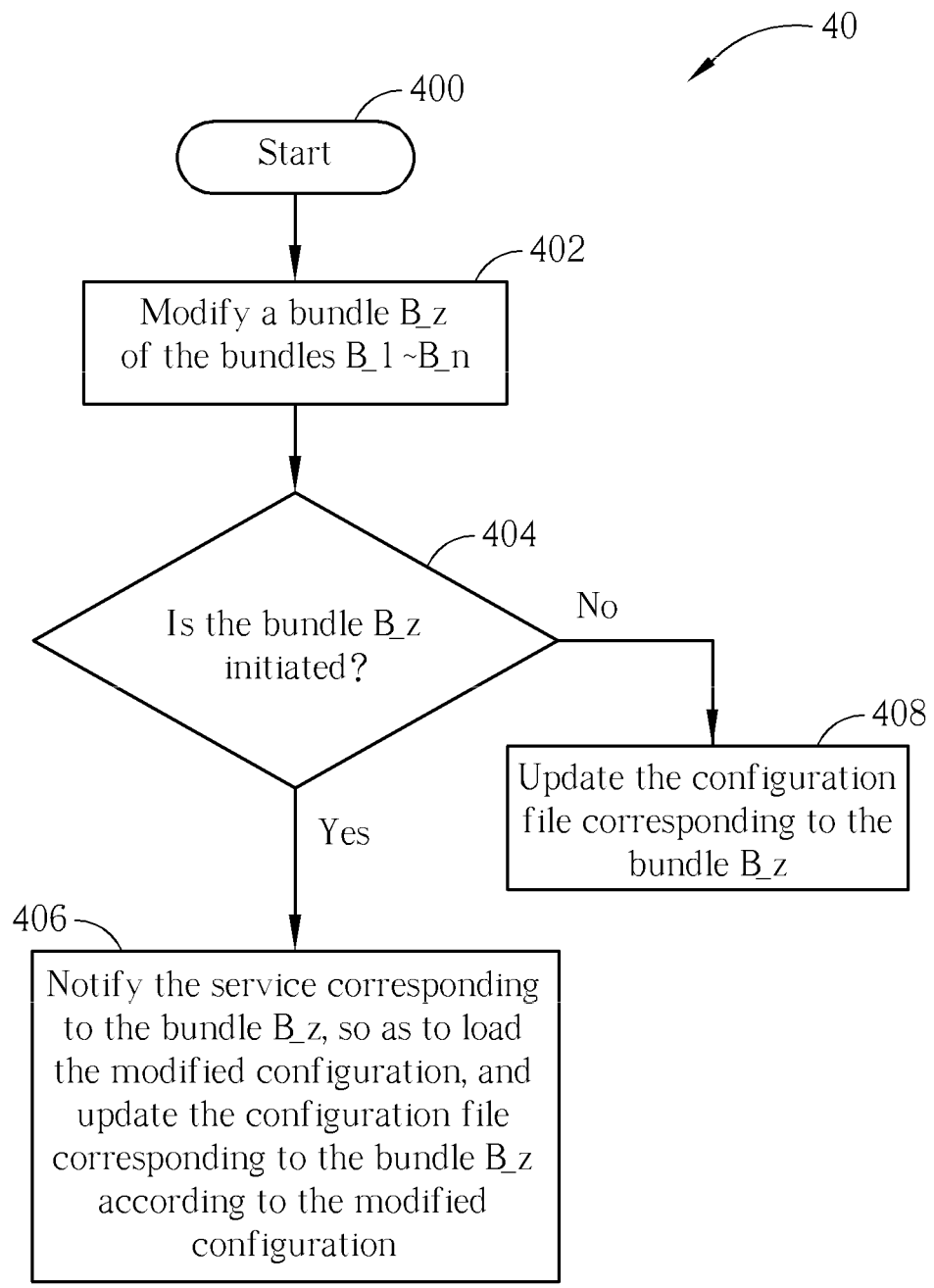
FIG. 4 is a schematic diagram of a modification process for the management architecture shown in FIG. 1.

Operations of the management architecture 10 are illustrated by FIG. 2 to FIG. 4.

First, please refer to FIG. 2, which is a schematic diagram of a process 20 for the management architecture 10. The process 20 comprises the following steps:

Step 200: Start.

Step 202: Add the bundles B_1~B_n to a service list, and generate configuration files corresponding to the bundles B_1~B_n.

Step 204: Store the configuration files corresponding to the bundles B_1~B_n.

Step 206: Update the status corresponding to the bundle B_x of the bundles B_1~B_n when the bundle B_x is initiated.

Step 208: Load the configuration file corresponding to the bundle B_x.

Step 210: End.

Via the process 20, the bundles B_1~B_n are registered at the management device 100, so as to add the bundles B_1~B_n to the service list. Meanwhile, the setting unit 106 generates a default configuration file, and stores the default configuration file in the storing unit 102. Then, according to initiation statuses of the bundles B_1~B_n, the updating unit 108 updates the service list, such that the loading unit 104 can load the corresponding configuration files accordingly.

Therefore, in the process 20, the bundles B_1~B_n are registered at the management device 100, so as to generate the corresponding configuration files for further uses. However, in some cases, a new bundle may be added, which can be processed according to FIG. 3.

FIG. 3 is a schematic diagram of an initiation process 30 for the management architecture 10. The initiation process 30 comprises the following steps:

Step 300: Start.

Step 302: A bundle B_y is initiated.

Step 304: Determine whether the bundle B_y is registered. If yes, go to step 308; else, go to step 306.

Step 306: Execute the registry process of the bundle B_y.

Step 308: Load the configuration file corresponding to the bundle B_y.

According to the initiation process 30, when the bundle B_y is initiated, the present invention first determines whether the bundle B_y is registered. If the bundle B_y has been registered, meaning that the corresponding configuration file has been stored in the storing unit 102, then the present invention loads the configuration file. On the contrary, if the bundle B_y has not been registered, the present invention executes the registry process of the bundle B_y, namely to add the bundle B_y to the service list, generate the configuration file corresponding to the bundle B_y, and store all the generated files in the storing unit 102. Therefore, via the initiation process 30, the management architecture 10 can determine to load the configuration file or to execute the registry process based on whether the bundle B_y is registered.

Moreover, in some cases, the user may need to modify configuration of a bundle which has been registered, which can be processed according to FIG. 4.

FIG. 4 is a schematic diagram of a modification process 40 for the management architecture 10. The modification process 40 comprises the following steps:

Step 400: Start.

Step 402: Modify a bundle B_z of the bundles B_1~B_n.

Step 404: Determine whether the bundle B_z is initiated. If yes, go to step 406; else, go to step 408.

Step 406: Notify the service corresponding to the bundle B_z, so as to load the modified configuration, and update the configuration file corresponding to the bundle B_z according to the modified configuration.

Step 408: Update the configuration file corresponding to the bundle B_z.

According to the modification process 40, when the bundle B_z which has been registered is modified, the present invention determines whether the bundle B_z is initiated. If the bundle B_z has been initiated, the present invention notifies the service corresponding to the bundle B_z, so as to load the modified configuration, and update the configuration file corresponding to the bundle B_z according to the modified configuration. On the contrary, if the bundle B_z has not been initiated, then the present invention updates the configuration file corresponding to the bundle B_z directly. Therefore, according to whether the bundle B_z is initiated, the present invention performs different processes, to meet requirements of different cases.

Therefore, as can be seen from FIG. 2~FIG. 4, the bundles B_1~B_n are registered at the management device 100, such that the setting unit 106 can add the bundles B_1~B_n to the service list and generate the corresponding configuration files. Then, the updating unit 108 can update the service list, such that the loading unit 104 can load the corresponding configuration files accordingly. Meanwhile, when initiating a bundle, the management device 100 can check whether the bundle is registered, to determine to load a corresponding configuration file or to execute a registry process. In addition, when the user need to modify a configuration of a bundle which has been registered, the management device 100 can perform different execution processes according to whether the bundle is initiated, to meet requirements of different cases.

In addition, after the loading unit 104 loads the configuration file corresponding to the bundle B_x, if the bundle B_x is deactivated, the loading unit 104 can remove (or disable) the configuration file corresponding to the bundle B_x. Simply speaking, the loading unit 104 only loads configuration files corresponding to bundles which have been initiated, and the loading unit 104 removes configuration files corresponding to bundles which have been initiated but deactivated on the midway.

As mentioned above, in the prior art, since User Interface Service Bundle is represented by a user interface, the user cannot set the SIP communicator if the SIP communicator is installed in an architecture without any peripheral output, which may affect operations of the SIP communicator. In comparison, in the present invention, even if an SIP communicator is installed in an architecture without any peripheral output, normal operations of the SIP communicator can be maintained because the management device 100 can generate and load corresponding configuration files. Notice that, the SIP communicator is used for illustrating the present invention, and other OSGi services can be applied to the present invention. Therefore, the present invention can make bundles of OSGi service platform no longer work individually, to integrate all bundles in the same management program, so as to greatly improve a modular level, communicative ability and transplantation ability. And, there is no need to develop different setting programs independently.

To sum up, the present invention provides methods and related management architecture for managing bundles in an OSGi service platform, to make the bundles of OSGi service platform no longer work individually, to integrate all bundles in the same management program, and to greatly improve a modular level, communicative ability and transplantation ability. And, there is no need to develop different setting programs independently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing a plurality of bundles in an open services gateway initiative service platform, the method executed by a computing device, and the method comprising:

adding, by a setting unit, the plurality of bundles into a service list, and generating default configuration files corresponding to the plurality of bundles;

storing, by a storing unit, the default configuration files corresponding to the plurality of bundles after the plurality of bundles is stored into the service list, and the default configuration files corresponding to the plurality of bundles are generated;

updating, by an updating unit, a status corresponding to a first bundle of the plurality of bundles in the service list when the first bundle is initiated after the default configuration files corresponding to the plurality of bundles are stored;

loading, by a loading unit, the default configuration file corresponding to the first bundle after the status corresponding to the first bundle of the plurality of bundles in the service list is updated;

notifying, by the setting unit, a service corresponding to the first bundle when a configuration corresponding the first bundle is modified, so as to load the modified configuration;

updating, by the updating unit, the default configuration file corresponding to the first bundle according to the modified configuration;

updating, by the updating unit, a default configuration file corresponding to a second bundle of the plurality of bundles when the configuration corresponding to the second bundle is modified and the second bundle is not initiated; and deactivating, by the loading unit, the default configuration file corresponding to the first bundle when the first bundle is deactivated.

2. The method of claim 1 further comprising:

adding, by the setting unit, a third bundle different from the plurality of bundles into the service list when the third bundle is initiated, and generating a default configuration file corresponding to the third bundle;

storing, by the storing unit, the default configuration file corresponding to the third bundle;

updating, by the updating unit, a status corresponding to the third bundle in the service list; and loading, by the loading unit, the default configuration file corresponding to the third bundle.

* * * * *